(12) United States Patent
Cernohous et al.

(10) Patent No.: US 10,781,596 B2
(45) Date of Patent: *Sep. 22, 2020

(54) POLYMERIC COMPOSITES, RESULTING PANELS, AND METHOD FOR PRODUCING THE SAME

(71) Applicant: Magma Flooring LLC, River Falls, WI (US)

(72) Inventors: Jeffrey Jacob Cernohous, Hudson, WI (US); Greggory S Bennett, Hudson, WI (US); Brandon Cernohous, Hudson, WI (US); Garrett S Van Gorden, New Richmond, WI (US)

(73) Assignee: MAGMA FLOORING LLC, River Falls, WI (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/555,930

(22) Filed: Nov. 28, 2014

(65) Prior Publication Data

US 2015/0152650 A1 Jun. 4, 2015

Related U.S. Application Data

(63) Continuation of application No. PCT/US2013/043342, filed on May 30, 2013.
(Continued)

(51) Int. Cl.
| | |
|---|---|
| C08K 3/22 | (2006.01) |
| E04F 15/10 | (2006.01) |
| C08K 3/26 | (2006.01) |
| C08K 7/14 | (2006.01) |
| C08K 7/02 | (2006.01) |
| C08K 11/00 | (2006.01) |
| B29B 17/00 | (2006.01) |
| B32B 27/20 | (2006.01) |
| B32B 27/32 | (2006.01) |
| C08K 3/013 | (2018.01) |
| C08J 5/00 | (2006.01) |
| B29C 43/00 | (2006.01) |

(Continued)

(52) U.S. Cl.
CPC ........ *E04F 15/107* (2013.01); *B29B 17/0042* (2013.01); *B29C 43/003* (2013.01); *B29C 43/24* (2013.01); *B29C 43/305* (2013.01); *B29C 43/32* (2013.01); *B32B 27/20* (2013.01); *B32B 27/32* (2013.01); *B32B 37/10* (2013.01); *B32B 37/182* (2013.01); *B32B 37/24* (2013.01); *C08J 5/00* (2013.01); *C08K 3/013* (2018.01); *C08K 3/22* (2013.01); *C08K 3/26* (2013.01); *C08K 3/36* (2013.01); *C08K 7/02* (2013.01); *C08K 7/14* (2013.01); *C08K 7/26* (2013.01); *C08K 11/00* (2013.01); *C08L 23/06* (2013.01); *E04F 15/02038* (2013.01); *E04F 15/105* (2013.01); *B29K 2023/0633* (2013.01); *B29K 2023/12* (2013.01); *B29K 2105/16* (2013.01); *B29K 2105/26* (2013.01); *B29K 2509/00* (2013.01); *B29L 2007/002* (2013.01); *B29L 2009/00* (2013.01); *B32B 37/12* (2013.01); *B32B 2264/02* (2013.01); *B32B 2264/10* (2013.01); *B32B 2264/12* (2013.01); *B32B 2272/00* (2013.01); *B32B 2305/30* (2013.01); *B32B 2305/70* (2013.01); *B32B 2323/04* (2013.01); *B32B 2323/10* (2013.01); *B32B 2419/04* (2013.01); *B32B 2471/00* (2013.01); *C08J 2323/06* (2013.01); *C08J 2323/12* (2013.01); *C08J 2497/02* (2013.01); *C08K 2003/2206* (2013.01); *C08K 2003/265* (2013.01); *C08L 2205/16* (2013.01); *C08L 2207/066* (2013.01); *C08L 2207/20* (2013.01); *Y02W 30/62* (2015.05); *Y10T 428/24149* (2015.01); *Y10T 428/24157* (2015.01); *Y10T 428/249991* (2015.04); *Y10T 428/28* (2015.01); *Y10T 428/2848* (2015.01); *Y10T 428/3167* (2015.04); *Y10T 428/31678* (2015.04); *Y10T 428/31913* (2015.04); *Y10T 428/31938* (2015.04)

(58) Field of Classification Search
None
See application file for complete search history.

(56) References Cited

U.S. PATENT DOCUMENTS

| | | |
|---|---|---|
| 2,371,868 A | 3/1945 | Berg et al. |
| 3,668,179 A | 6/1972 | Di Biasi et al. |

(Continued)

FOREIGN PATENT DOCUMENTS

| | | |
|---|---|---|
| CN | 102432959 A | 5/2012 |
| EP | 0 651 003 A1 | 5/1995 |

(Continued)

OTHER PUBLICATIONS

"ASTM E831-14: Standard Test Method for Linear Thermal Expansion of Solid Materials by Thermomechanical Analysis," Aug. 1, 2014 (5 pgs).

(Continued)

*Primary Examiner* — Edward J Cain
(74) *Attorney, Agent, or Firm* — Patterson Thuente Pedersen, P.A.

(57) ABSTRACT

A polymeric composite derived from a reclaimed polymeric material. The polymeric composite in particulate form can be thermally compressed into panels and other embodiments that require a component that possesses sufficient mechanical strength and moisture resistance. In certain embodiments, the panel may be utilized as one layer in a multilayered article.

19 Claims, 2 Drawing Sheets

Related U.S. Application Data

(60) Provisional application No. 61/653,173, filed on May 30, 2012, provisional application No. 61/716,048, filed on Oct. 19, 2012, provisional application No. 61/788,986, filed on Mar. 15, 2013.

(51) Int. Cl.

| | | |
|---|---|---|
| *B29C 43/24* | (2006.01) | |
| *B29C 43/30* | (2006.01) | |
| *B29C 43/32* | (2006.01) | |
| *B32B 37/24* | (2006.01) | |
| *C08K 3/36* | (2006.01) | |
| *C08K 7/26* | (2006.01) | |
| *C08L 23/06* | (2006.01) | |
| *B32B 37/10* | (2006.01) | |
| *B32B 37/18* | (2006.01) | |
| *E04F 15/02* | (2006.01) | |
| *B32B 37/12* | (2006.01) | |
| *B29K 23/00* | (2006.01) | |
| *B29K 105/16* | (2006.01) | |
| *B29K 105/26* | (2006.01) | |
| *B29K 509/00* | (2006.01) | |
| *B29L 7/00* | (2006.01) | |
| *B29L 9/00* | (2006.01) | |

(56) References Cited

U.S. PATENT DOCUMENTS

| | | | |
|---|---|---|---|
| 3,684,645 A | 8/1972 | Temple et al. | |
| 3,717,499 A | 2/1973 | McClure | |
| 4,164,526 A | 8/1979 | Clay et al. | |
| 4,248,931 A | 2/1981 | Salman | |
| 4,547,421 A | 10/1985 | Dunbar | |
| 4,616,042 A | 10/1986 | Avakian | |
| 4,767,580 A | 8/1988 | Shingo et al. | |
| 4,793,956 A | 12/1988 | Nogiwa et al. | |
| 4,878,970 A | 11/1989 | Schubert et al. | |
| 5,118,532 A | 6/1992 | Batson et al. | |
| 5,219,163 A | 6/1993 | Watson | |
| 5,238,622 A | 8/1993 | Grimmer | |
| 5,351,895 A | 10/1994 | Brooks et al. | |
| 5,364,412 A | 11/1994 | Furukawa | |
| 5,827,460 A | 10/1998 | Brentrup et al. | |
| 5,965,232 A * | 10/1999 | Vinod | B32B 5/24 |
| | | | 442/94 |
| 5,973,049 A | 10/1999 | Bieser et al. | |
| 6,017,991 A | 1/2000 | Drummond et al. | |
| 6,068,715 A | 5/2000 | Yokokita et al. | |
| 6,153,674 A | 11/2000 | Landin | |
| 6,231,650 B1 | 5/2001 | Mallow et al. | |
| 6,271,270 B1 | 8/2001 | Muzzy et al. | |
| 6,316,075 B1 | 11/2001 | Desai et al. | |
| 6,387,967 B2 | 5/2002 | Muzzy et al. | |
| 6,572,697 B2 | 6/2003 | Gleeson et al. | |
| 6,620,487 B1 | 9/2003 | Tonyan et al. | |
| 6,743,742 B1 | 6/2004 | LaRocco et al. | |
| 6,861,128 B1 * | 3/2005 | Muller | B32B 33/00 |
| | | | 428/156 |
| 6,872,246 B2 | 3/2005 | Muller et al. | |
| 6,907,708 B2 | 6/2005 | Naji et al. | |
| 7,081,300 B2 | 7/2006 | Laurence et al. | |
| 7,241,818 B2 | 7/2007 | Hemmings et al. | |
| 7,361,401 B2 | 4/2008 | Desai et al. | |
| 7,455,793 B2 | 11/2008 | Hsu | |
| 7,470,488 B2 | 12/2008 | Lee et al. | |
| 7,763,345 B2 | 7/2010 | Chen et al. | |
| 8,106,105 B2 | 1/2012 | Cernohous | |
| 8,431,054 B2 | 4/2013 | Pervan et al. | |
| 2001/0028127 A1 | 10/2001 | Hinds et al. | |
| 2002/0025414 A1 | 2/2002 | Desai et al. | |
| 2002/0031653 A1 | 3/2002 | Ricciardelli et al. | |
| 2005/0020747 A1 | 1/2005 | Symons | |
| 2005/0124763 A1 | 6/2005 | Mikami et al. | |
| 2005/0166513 A1 | 8/2005 | Vanderhoef | |
| 2006/0019078 A1 | 1/2006 | Osten et al. | |
| 2007/0020747 A1 | 1/2007 | Lu | |
| 2007/0027234 A1 | 2/2007 | Sigworth et al. | |
| 2007/0072961 A1 | 3/2007 | Ma et al. | |
| 2008/0001429 A1 | 1/2008 | Willis et al. | |
| 2008/0187739 A1 | 8/2008 | Baker et al. | |
| 2008/0207831 A1 | 8/2008 | Feinberg | |
| 2008/0287576 A1 | 11/2008 | Nichols et al. | |
| 2010/0010141 A1 | 1/2010 | Nakamura et al. | |
| 2010/0016459 A1 | 1/2010 | Cernohous | |
| 2010/0030003 A1 | 12/2010 | Pervan et al. | |
| 2011/0177308 A1 | 7/2011 | Anderson et al. | |
| 2012/0059074 A1 | 3/2012 | Adkinson et al. | |
| 2012/0070646 A1 | 3/2012 | Ha et al. | |
| 2012/0135203 A1 * | 5/2012 | Albert | B32B 5/02 |
| | | | 428/192 |
| 2013/0147090 A1 | 6/2013 | Schromm et al. | |
| 2013/0189511 A1 | 7/2013 | Cernohous et al. | |
| 2015/0065974 A1 | 3/2015 | Michiels et al. | |
| 2015/0152650 A1 | 6/2015 | Cernohous et al. | |

FOREIGN PATENT DOCUMENTS

| | | | |
|---|---|---|---|
| EP | 0 794 214 A2 | 9/1997 | |
| EP | 2339092 A1 | 6/2011 | |
| EP | 2754688 | 7/2014 | |
| JP | 510098798 A | 8/1976 | |
| JP | 04236246 A | 8/1992 | |
| JP | H06-508567 A | 9/1994 | |
| JP | 2002322810 | 8/2002 | |
| JP | 2004-292653 A | 10/2004 | |
| JP | 2005-082802 A | 3/2005 | |
| KR | 10-2002-0071203 | 9/2002 | |
| KR | 10-2002-0071204 | 9/2002 | |
| SU | 1775425 A1 | 11/1992 | |
| WO | WO 01/98064 A2 | 12/2001 | |
| WO | WO 2002/15299 A1 | 2/2002 | |
| WO | WO 2007/102825 A1 | 9/2007 | |
| WO | WO 2008094529 A1 * | 8/2008 | ............ C08J 9/0066 |
| WO | 2009134403 | 11/2009 | |
| WO | WO 2012/001091 A1 | 1/2012 | |
| WO | WO2012016916 | 2/2012 | |
| WO | WO 2013/181379 A1 | 12/2013 | |
| WO | WO2013179260 | 12/2013 | |
| WO | WO 2014/207308 A1 | 12/2014 | |
| WO | WO 2016/115556 A1 | 7/2016 | |

OTHER PUBLICATIONS

"Polyvinyl Chloride (PVC) Typical Properties Generic PVC, Rigid | UL Prospector," Jan. 6, 2015, XP055502548, Retrieved from the Internet: URL: https://web.archive.org/web/20150106145449/http://plastics.ulprospector.com:80/generics/46/c/t/polyvinyl-chloride-pvc-properties-processing/sp/8 [retrieved on Aug. 28, 2018].

"Composite Solutions, Reinforcement Guide: Transforming the World with Advanced Solutions," Mar. 1, 2011, XP 055508480, Toledo, Ohio, 43659; Retrieved from the Internet: <URL:http://www.ocvreinforcements.com/pdf/library/Composite_Solutions_Guide_100360_Efinalprintable.pdf>[retrieved on Sep. 20, 2018] (128 pgs).

Chinese Office Action for Application No. 201380027887.7, dated Jan. 29, 2016 and English Translation (8 pgs).

CN OA for App No. 201680041873.4, mailed Jan. 11, 2019; 6 pgs.

CN OA for App No. 201680041873.4, mailed Jan. 11, 2019; Translation—7 pgs.

EP Communication for Application No. 13 796 809.5-1377 pursuant to Article 94(3) EPC, dated Aug. 17, 2017 (7 pgs).

EP Communication for Application No. 13796809.5, dated Aug. 17, 2017 (7 pgs).

European Response for Application No. 13 796 809.5-1303, filed Feb. 27, 2018 (6 pgs).

European Response for Application No. 13 796 809.5-1303, filed Jul. 11, 2016 (27 pgs).

(56) References Cited

OTHER PUBLICATIONS

European Response for Application No. 16738034.4-1102, filed Apr. 24, 2019 (6 pgs).
Extended European Search Report for Application No. 13 796 809.5-1303, dated Dec. 15, 2016 (9 pgs).
Extended European Search Report for Application No. 16797376.7, dated Dec. 7, 2018 (11 pgs.).
Extended European Search Report for European Application No. 16738034.4, dated Sep. 28, 2018 (12 pgs).
International Preliminary Report on Patentability for PCT Application No. PCT/US2013/043342, dated Dec. 2, 2014 (7 pgs).
International Preliminary Report on Patentability for PCT Application No. PCT/US2016/033516, dated Nov. 30, 2017 (11 pgs).
International Preliminary Report on Patentability in International Application No. PCT/US2016/013797, dated Jul. 18, 2017 (9 pgs).
International Search Report and Written Opinion for Application No. PCT/US2013/043342, dated Aug. 27, 2013 (9 pgs).
International Search Report and Written Opinion for Application No. PCT/US2016/56067, dated Dec. 23, 2016 (12 pgs).
International Search Report for PCT Application No. PCT/US2013/043342, dated Aug. 17, 2013 (3 pgs).
International Search Report for PCT Application No. PCT/US2016/033516, dated Aug. 17, 2016 (2 pgs).
International Search Report in International Application No. PCT/US2016/013797, dated Jul. 1, 2016 (3 pgs).
IPRP for Application No. PCT/US2016/56067, mailed Apr. 19, 2018 (7 pgs).
Office Action in U.S. Appl. No. 15/575,758, filed Feb. 19, 2019.
Office Action for U.S. Appl. No. 12/523,819, dated Sep. 28, 2011 (4 pgs).
Partial supplementary European search report for Application No. 16797376.7, dated Sep. 5, 2018 (16 pgs.).
Naranjo C. et al., "Thermal Properties" in Plastics Testing and Characterization, Industrial Applications, Nov. 1, 2012, Hanser Fachbuchverlag, Munchen, XP 055508349, ISBN: 978-3-446-41315-3, Title page, pp. 88-94, and Abstract (10 pgs).
Response as filed in Application No. 13796809.5, Feb. 27, 2018.
Response as filed in Application No. 13796809.5, Jul. 11, 2016.
Response to CN OA of Jan. 29, 2016 for Application No. 201380027887.7, no date indicated (12 pgs).
Response to Restriction Requirement in U.S. Appl. No. 15/575,758, filed Feb. 1, 2019.
Restriction Requirement in U.S. Appl. No. 15/575,758, dated Nov. 1, 2018.
Second Chinese Office Action for Application No. 201380027887.7, no date indicated (7 pgs).
Supplementary European Search Report, Application No. 13 796 809.5-1303, dated Dec. 8, 2015 (2 pgs).
Written Opinion for PCT Application No. PCT/US2016/033516, dated Aug. 17, 2016 (9 pgs).
Written Opinion in International Application No. PCT/US2016/013797, dated Jul. 1, 2016 (8 pgs).

\* cited by examiner

POLYMERIC COMPOSITES, RESULTING PANELS, AND METHOD FOR PRODUCING THE SAME

CROSS REFERENCE TO RELATED APPLICATIONS

This application claims priority to PCT Application No. PCT/US2013/043342, filed May 30, 2013, which claims priority to U.S. Provisional Patent Application No. 61/653,173 filed May 30, 2012, U.S. Provisional Patent Application No. 61/716,048 filed Oct. 19, 2012, and U.S. Provisional Patent Application No. 61/788,986 filed Mar. 15, 2013, the disclosure of each are herein incorporated by reference in their entirety.

TECHNICAL FIELD

Compositions and methods for producing composite substrates in this disclosure are suitable for various applications, and more particularly flooring applications. The resulting substrates possess superior moisture resistance and mechanical properties that enable utilization in indoor, outdoor, construction, and marine applications.

BACKGROUND

The flooring market frequently utilizes polyvinyl chloride (PVC) as a material for a base substrate in a multi-billion dollar market that continues to exhibit substantial growth. However, regulatory pressures are driving leading flooring manufacturers to actively seek PVC-free alternatives. The environmental and regulatory pressures are due to long-suspected PVC health hazards and well known end-of-life waste management challenges. Additionally, it is well documented that PVC contains migrating additives (plasticizers) that are observed to cause odor and have been implicated as potential health hazards. It is also a known fact that PVC releases highly toxic chemicals when burned or improperly disposed of at the end of its useful life cycle. Because of these issues, various regulatory agencies around the world are pressing for a ban on PVC. The European Union has been particularly aggressive in pursuing regulatory action and has banned PVC use in toys and is considering a full ban. All of these actions negatively impact the consumer's perception of PVC and are requiring manufacturers, including flooring manufacturers to urgently seek a suitable alternative.

Despite the high pressure to replace PVC in applications such as flooring, it has been difficult to find a suitable alternative material because of PVC's inherent features of low cost, durability, moisture resistance, tailored stiffness, dimensional stability and flame retardancy. Various products have been developed to replace PVC to date but none have offered a price-to-performance ratio to make them attractive for broad commercial utility in the flooring market. Furthermore, none of the non-PVC alternatives have been of significant commercial utility for the rapidly growing laminate flooring market segment where a relatively thick, stiff and moisture resistant substrate is required to enable efficient and innovative installation in various forms and applications.

SUMMARY

The absence of a breakthrough innovation to cost-effectively replace PVC combined with the strong environmental and regulatory pressure to replace PVC represents a unique opportunity to technologically revolutionize a flooring market segment that is urgently seeking such an alternative. This disclosure is directed to the formation of polymeric composites derived from a reclaimed polymeric material. This material, upon further processing, is well suited to replace PVC in flooring applications. The reclaimed polymeric material is generally a material that is not easily melt processed due to its varying polymeric components, varying filler content, varying cellulosic fiber content, and its varying and relatively high moisture content. In certain embodiments, the material can be rendered usable by combining it with other additives and fillers. For example, a desiccant may enable the melt processing of the material in certain forms to create a desirable polymeric composite that may be subsequently processed. In some embodiments, the reclaimed polymeric material contains, or is combined with, a high aspect ratio filler, a lightweight filler and optionally other organic and inorganic fillers to create a unique polymer composite.

The polymeric composite derived from the reclaimed polymeric material is well suited to form substrates used in a variety of applications requiring moisture resistance, including flooring applications. Generally, the polymeric composite is thermally compressed into a flat panel using processing equipment such as, for example, a continuous double belt press. In one embodiment, the polymeric composite containing expanded volcanic ash is spread as pellets onto a continuous double belt press, thermally compressed to form a continuous flat panel in the down stream direction, and then subsequently divided into smaller flat panels. The substrates of this disclosure, made using the polymeric composite derived from the reclaimed polymeric material, may be formed to serve various industries and end use applications.

The substrates may be employed to create multilayered articles. Aesthetic layers may be bonded to a surface of the substrate to create articles suited for flooring applications. Laminated flooring tile, similar to so called Luxury Vinyl Tile, is one embodiment employing the substrates of this disclosure as a base panel. The substrates may also be utilized as base panels for receiving and holding other functional layers. Functional layers may include materials that provide desirable characteristics such as adhesion, dampening (sound, etc.), friction, and antistatic properties, among others.

The resulting panels and multilayered articles produced from various embodiments of the substrates disclosed exhibit excellent physical characteristics and a resistance to moisture. The coefficient of thermal expansion of the panels is at a level that makes the panels very desirable for end use applications, such as flooring. A low coefficient of thermal expansion minimizes certain types of floors from expanding and contracting when exposed to heat sources or even sunlight. Certain embodiments have an excellent resistance to moisture and exhibit negligible moisture uptake. The moisture resistance is a very attractive feature that renders floors durable, less likely to expand due to moisture and improves their longevity especially in moist or humid environments.

The following terms used in this application are defined as follows:

"Cellulosic Material or Filler" means natural or man-made materials derived from cellulose. Cellulosic materials include, for example: wood flour, wood fibers, sawdust, wood shavings, newsprint, paper, flax, hemp, grain hulls, kenaf, jute, sisal, nut shells or combinations thereof.

"Composite" means a mixture of a polymeric material and another compound or filler.

"Desiccant" means a material that either induces or sustains a state of dryness.

"High Aspect Ratio Filler" means an organic or inorganic material having an aspect ratio of at least 2:1, and in some embodiments at least 4:1, that does not possess viscoelastic characteristics under the conditions utilized to melt process a filled polymeric matrix.

"Filler" means an organic or inorganic material that does not possess viscoelastic characteristics under the conditions utilized to melt process a filled polymeric matrix.

"Lightweight Filler" means an organic or inorganic material with a specific gravity of less than 0.7 g/cm$^3$ and does not possess viscoelastic characteristics under the conditions utilized to melt process a filled polymeric matrix.

"Melt Processable Composition" means a formulation that is melt processed, typically at elevated temperatures, by means of a conventional polymer processing technique such as, for example, extrusion or injection molding.

"Naturally Occurring Inorganic Material" means an inorganic material that is found in nature, for example, volcanic ash and calcium carbonate.

"Polymeric Matrix" means a melt processable polymeric material or resin.

"Reclaimed Polymeric Material" means material resulting from a recycling or reclamation process, such as for example, hydropulping waste streams, that contain a polymer, or mix of polymers, and in some embodiments, cellulosic material.

"Viscoelastic Characteristic" means characteristics of materials that exhibit both viscous and elastic properties when subjected to deformation.

The above summary is not intended to describe each disclosed embodiment or every implementation. The detailed description that follows more particularly exemplifies illustrative embodiments.

DETAILED DESCRIPTION

Figure 1:
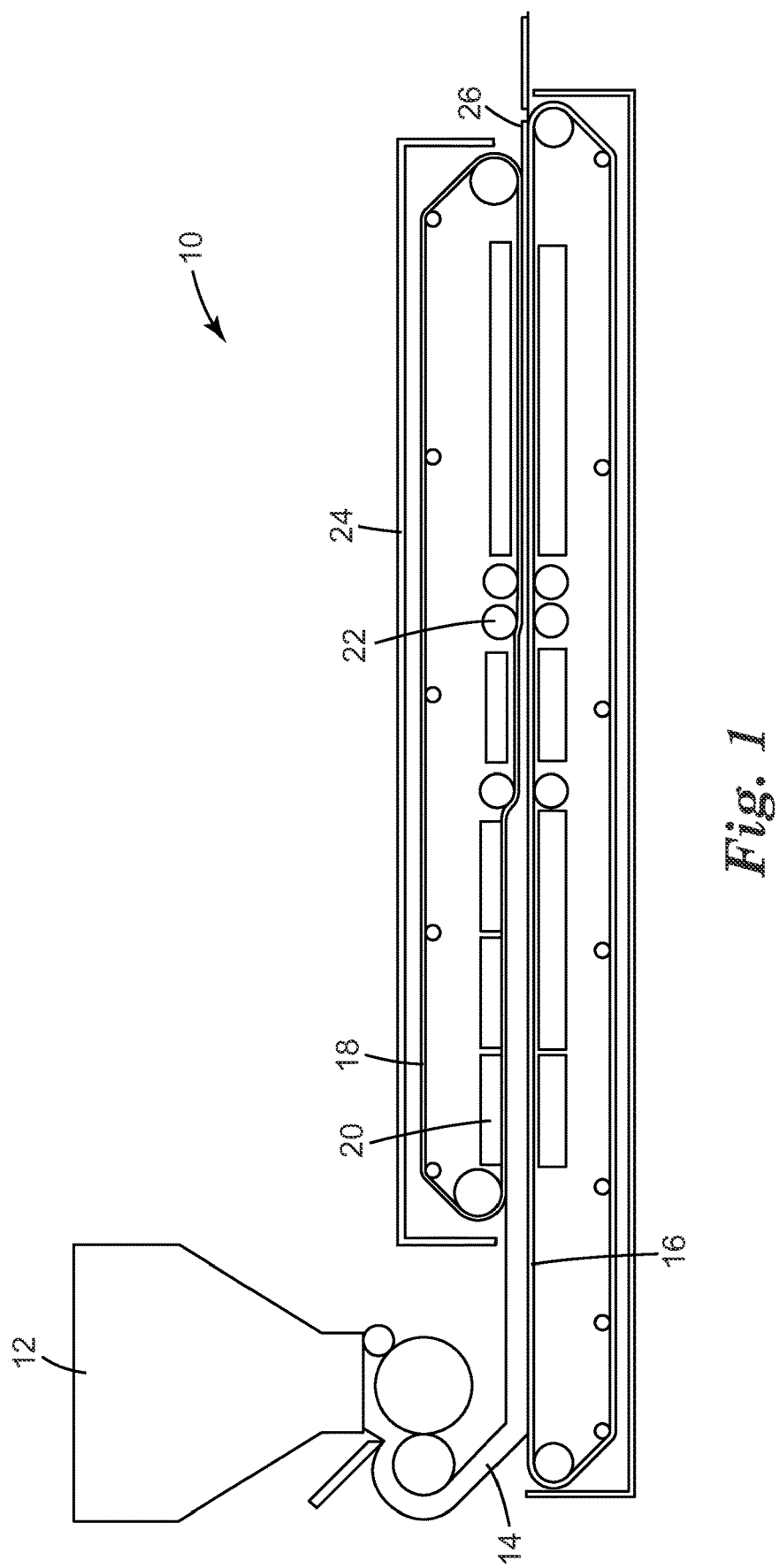
FIG. 1 is a schematic of a thermal compression process suitable for practicing various embodiments of the disclosure.

This disclosure is directed at a polymeric composite that is derived from either polymeric materials or reclaimed polymeric material. Various optional fillers can be added to tailor the properties of the polymeric composite. Individual components or the components in composite form, whether as particulates or pellets, can be thermally compressed into substrates, which can be converted into panels and other embodiments that require sufficient mechanical strength and physical characteristics. In certain embodiments, the panel may be utilized as one layer in a multilayered article.

The polymeric composite may be derived from a reclaimed polymeric material. Various optional fillers can also be added to tailor the physical properties as required. For example, in one embodiment, the composite is a reclaimed polymeric material, a high aspect ratio filler and a lightweight filler. The reclaimed polymeric material may be a material resulting from a recycling or reclamation process that contains a mix of polymer, or polymers, and, in certain embodiments, cellulosic material having a high aspect ratio. One example is the hydropulping process used primarily for recovering cellulosic material from plastic coated paper products. The reclaimed polymeric material may be included in the composite in amounts up to 99 wt %.

Plastic coated paper products are commonly used in many applications, including those in the food industry. For example, milk or juice cartons, cups, trays, plates and other various other food service applications are common uses of plastic coated paper. Due to the paper content of the used material, recycling is very desirable to capture and reclaim the paper. As such, hydropulping processes are one method employed to recapture the desirable paper for reclamation. Hydropulping is the aggressive separation of plastic from a major portion of the paper through an aqueous process. The polymer content and type may vary widely in the collection and reclamation of the paper. The polymeric material resulting from the hydropulping process is considered scrap or a waste stream because it may contain various types of polymers along with some paper content, water from the process and other contaminants inherent to recycling processes. An example of a hydropulping process can be found in U.S. Pat. No. 5,351,895, herein incorporated by reference in its entirety. Other examples of reclaimed waste plastic streams would include plastics captured from municipal waste, waste streams from agricultural films, plastic medical waste, plastic carpet waste, and other such plastic waste streams that are typically disposed of due to their inhomogeneous or contaminated nature. In certain applications, the waste streams are typically cleaned with water and contain residual moisture that can be problematic for developing useful substrates.

In some embodiments, the resulting reclaimed polymeric material is generally a non-homogenous compound that is considered a waste stream. The resulting reclaimed polymeric is difficult to consistently melt process because of its varying components and water content. The reclaimed polymeric material can generally be characterized as a polymer matrix with various filler levels and high moisture content. The reclaimed polymeric material may have a cellulosic material content of about 5 wt % to about 40 wt %. The moisture content may be in the range of about 0.2 wt % to about 10 wt %. The reclaimed polymeric material may not be well suited for consistent melt processing methods on its own.

The reclaimed polymeric material may be combined with fillers to achieve a desired end result. Embodiments, with an inorganic filler, an organic filler, a coupling agent, a desiccant, a lubricant, an antimicrobial or combinations thereof are all contemplated by this disclosure. The fillers may be combined with the reclaimed polymeric material to form a desired composite. Additionally, in certain embodiments, the fillers may be combined with the reclaimed polymeric material, a high aspect ratio filler a lightweight filler and optionally additional fillers to obtain a composite possessing particularly desirable physical characteristics that render an end article very durable.

A high aspect ratio filler may be suitable in certain embodiments. High aspect ratio fillers are organic or inorganic materials having an aspect ratio of at least 2:1 (length:width), and in some embodiments at least 4:1. Non-limiting examples of high aspect ratio fillers include: volcanic ash, talc, mica, glass, montmorillonite clay, wollastonite, basalt, cellulosic fiber, glass fiber, aluminum fiber, steel fiber, carbon fiber and carbon nanotubes. In an alternative embodiment, the reclaimed polymeric material may already include a high aspect ratio filler. For example, reclaimed polymeric materials from a hydropulp process may contain cellulose with an aspect ratio greater than 2:1. The high aspect ratio filler may be included in the composite in amounts of about 2-60 wt % of the composition, 10-50 wt %, or 15-40 wt %.

A lightweight filler may be employed to address the specific gravity and potentially the strength characteristics of the desired end use composite. The lightweight fillers are organic or inorganic material with a specific gravity of less than 0.7 g/cm$^3$. In some embodiments, the specific gravity is less than 0.5 g/cm$^3$, and in others less than 0.3 g/cm$^3$. Non-limiting examples of lightweight fillers include expanded volcanic ash, perlite, pumice, cenospheres, glass microspheres, ceramic microspheres, polymeric microspheres, foamed polymer beads, cellulosic fibers or combinations thereof. The lightweight filler may be included in the composite in amounts of about 0.5-40 wt % of the composition, 2-35 wt %, or 5-30 wt %. Expanded volcanic ash or cellulosic fibers may be particularly desirable for certain embodiments.

The combination of a reclaimed polymeric material, a lightweight filler, a high aspect ratio filler and optionally other organic and inorganic fillers are well suited for particular applications. This is especially true in applications where the composite materials are used to generate a low cost, moisture resistant and durable substrate suitable for uses such as flooring panels. The noted combination of materials can be thermal compression bonded into such substrates.

In alternative embodiments, a desiccant is added to the reclaimed polymeric material to address melt processing issues caused often by moisture or to enable the formation of pellets for subsequent panel formation. One function of the desiccant is to tie up the moisture in the reclaimed polymeric material. The desiccant may be any conventional material capable of moisture uptake, and suitable for application in melt processed polymeric matrices. In one embodiment, the desiccant is selected from calcium oxide, magnesium oxide, strontium oxide, barium oxide, aluminum oxide, or combinations thereof. Those of ordinary skill in the art of melt processing polymers are capable of selecting a specific desiccant to achieve beneficial results. The amount of desiccant will vary, but may include a range of about 1 to 80 wt % of the formulation.

In certain embodiments, an inorganic material may be included as a filler with the reclaimed polymeric material prior to or during processing. Inorganic fillers may include such materials as calcium carbonate or talc. Additionally, any naturally occurring inorganic material may be suitable for the formation of the polymeric composite. Some embodiments incorporate volcanic ash, mica, fly ash, andesiteic rock, feldspars, aluminosilicate clays, obsidian, diatomaceous earth, silica, silica fume, bauxite, geopolymers pumice, perlite, pumicsite and combinations thereof. The various forms of volcanic ash are well suited for many end use applications. In one embodiment, the inorganic material is chosen such that it has an aspect ratio of at least 1.5:1 (length:width), at least 3:1, or at least 5:1. In some embodiments, the inorganic material comprises 5-80 wt % of the composition, 20-70 wt %, or 30-60 wt %.

Organic materials may also be used as fillers in the composite materials. Various types of organic compounds conventionally recognized by those of ordinary skill in the art may be combined with the reclaimed polymeric material and optional fillers. In some embodiments, cellulosic materials may be utilized in melt processable compositions as fillers to impart specific physical characteristics or to reduce cost of the finished composition. Cellulosic materials generally include natural or wood based materials having various aspect ratios, chemical compositions, densities, and physical characteristics. Non-limiting examples of cellulosic materials include wood flour, wood fibers, sawdust, wood shavings, newsprint, paper, flax, hemp, rice hulls, grain hulls, kenaf, jute, sisal, nut shells, or combinations thereof. Combinations of cellulosic materials and a modified polymer matrix may also be used in the melt processable composition.

In another aspect, the composition may include coupling agents to improve the compatibility and interfacial adhesion between the reclaimed polymeric material and any inorganic materials or other fillers. Non-limiting examples of coupling agents include functionalized polymers, organosilanes, organotitanates and organozirconates. Preferred functionalized polymers included functionalized polyolefins, included maleated polyolefins, polyethylene-co-vinyl acetate, polyethylene-co-acrylic acid, and polyethylene-co-acrylic acid salts.

In yet another embodiment, the composition may contain other additives. Non-limiting examples of conventional additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, adhesion promoting agents and pigments. The additives may be incorporated into the composition in the form of powders, pellets, granules, or in any other form suitable for mixing. The amount and type of conventional additives in the composition may vary depending upon the scope of mixing, extrudable compounds and the desired physical properties of the finished composition. Those skilled in the art of mixing and melt processing are capable of selecting appropriate amounts and types of additives to match with a specific polymeric matrix in order to achieve desired physical properties of the finished material. In certain embodiments, blowing agents and foaming additives may be particularly desirable to control characteristics of the end use articles, such as for example, the coefficient of thermal expansion.

The composition can be prepared by any of a variety of ways. For example, the reclaimed polymeric material and the optional components may be combined together by any of the blending means usually employed in the plastics industry, such as an extruder, a compounding mill, a Banbury mixer, pulverizer, an agglomerator or other such mixing equipment. The materials may be used in various forms, for example, a powder, a pellet, or a granular product. The mixing operation may be conveniently carried out at a temperature above the melting point or softening point of the processing additive, though it is also feasible and sometimes preferable to dry-blend the components in the solid state as particulates and to directly utilize the dry blends for subsequent sheet formation. The resulting mixtures can be either extruded directly into the form of the final product shape or pelletized or otherwise comminuted into a desired particulate size or size distribution for subsequent processing.

Subsequent melt-processing typically is performed at a temperature from 120° C. to 300° C., although optimum operating temperatures are selected depending upon the melting point, melt viscosity, and thermal stability of the composition.

The resulting polymeric composite is durable, moisture resistant, bondable, and possesses a low thermal expansion coefficient. In some embodiments, the polymeric composite may exhibit at least two of flexural modulus of greater than 700 MPa, a notched impact strength of at least 300 J/m, a tensile elongation of at least 4%, and a coefficient of thermal expansion of less than 70 μm/m/K. The polymeric composite exhibits a specific gravity of about 0.9 to 1.6 g/cm$^3$, about 0.7 to 1.2 g/cm$^3$, or about 0.5 to 1.0 g/cm$^3$ In some embodiments, the polymeric composite exhibits a water absorption of less than 10% as indicated after submersion in room temperature water for twenty four hours. In other embodiments, water absorption is less than 5% under the noted test standard.

In another embodiment, a dry blend of the components may be processed directly in a thermal compression process, such as, for example, those processes embodied in this disclosure. In certain embodiments it may be desirable for the reclaimed polymer to be ground into a fine particle size. The components can be blended using conventional blending equipment, including a ribbon blender, v-blender or any blending equipment that can produce a uniform particulate dispersion of the components. The dry blend can be scattered or coated and processed into sheet articles using a continuous double belt press as described in this disclosure. This embodiment has the advantage in that no melt processing step is required prior to sheet or panel production.

The polymeric composite may be further processed into useful articles such as sheets, panels, and various other forms. In one embodiment, the article is a sheet derived from thermal compression bonding a plurality of pellets of the polymeric composites that were derived from the reclaimed polymeric material and a desiccant. Thermal compression bonding advantageously utilizes the polymeric composite in pellet form to create a panel that has desirable features.

A continuous double belt press may be used as a thermal compression manufacturing process. Unlike conventional polymer thermal processing methods such as extrusion and injection molding, the continuous double belt press process does not require precise melt state properties to create the resultant panel or sheet. Because the continuous double belt press does not require the compounded polymer to fill a die or mold to create its shape, it is uniquely suited to handle inhomogeneous materials, such as the polymeric composite of this disclosure derived from the reclaimed polymeric material. The continuous double belt press is capable of achieving this result because it only requires the compounded material to melt slightly during its process and effectively bonds the pellets together while minimizing voids under heat and pressure to form a substrate. This process enables the non-homogeneous and often varying composition of the reclaimed polymeric material used as the primary feedstock to be effectively melt processed into a board composition in widths up to 3 meters, thicknesses ranging from 2 mm to 12 mm, and effectively infinite lengths.

In one particular embodiment, a method is initiated by scattering pellets of a polymeric composite onto a first rotating belt. The polymeric composite may be derived from (i) a reclaimed polymeric material or polymer, and (ii) a lightweight filler. Thermal compression bonding the pellets then takes place between the first rotating belt with a second rotating belt to form a substrate.

A schematic of a continuous double belt process 10 is depicted in FIG. 1. A pellet scattering device 12 is employed to spread the desired polymeric composite as pellets 14 onto an extended lower belt 16. An upper belt 18 comes into contact with the scattered pellets 14 on the lower belt 16 near a heating zone 20. The heat melts or partially melts the pellets 14 and bonds them together (not shown). Nip rolls 22 apply compressive forces to assist in the processing of the pellets 14 to a panel 26 of indefinite length and may help orient high aspect ratio fillers to impart useful properties. An annealing zone 24 is used to finalize the process before the panel exits from belts 16 and 18. Such an apparatus is available from TechnoPartner Samtronic GmbH of Goppingen, Germany. Upon take off of the panel of indefinite length from the continuous double belt press, the panels are divided into smaller sections for end use applications.

The resulting panel or sheets of the thermally compressed polymeric composite may be employed for a variety of end use applications in part due to their physical and chemical characteristics. The polymeric composite is durable, moisture resistant, bondable, and possesses a low thermal expansion coefficient. In some embodiments, the polymeric composite may exhibit at least two of flexural modulus of greater than 700 MPa, a notched impact strength of at least 300 J/m, a tensile elongation of at least 4%, and a coefficient of thermal expansion of less than 70 μm/m/K. The polymeric composite exhibits a specific gravity of about 0.5 to 1.6 g/cm$^3$. The polymeric composite exhibits a resistance to moisture as demonstrated by a water uptake of less than 10 wt % after immersion in water for twenty four hours.

Another method useful in determining the resulting panel or sheets' relevant characteristics is the Thermal Expansion Test Method. The method requires a square sample of a panel measured in both the X and Y dimension at room temperature (25° C.) using a micrometer. The samples are then subsequently placed in a laboratory oven set to 70° C. After 1 hour, the samples are removed from the oven and immediately measured using a micrometer in the X and Y dimensions. The percent expansion is subsequently determined from these two measurements. Certain substrates contemplated by this disclosure have a thermal expansion of less than 0.5%, or less than 0.35%, according to the Thermal Expansion Test Method.

In certain embodiments, sheet articles produced using a thermal compression process may be highly isotropic. When sheet articles are produced using conventional melt processing techniques (e.g., sheet extrusion, injection molding), the resultant articles are highly anisotropic and typically have marked differences in mechanical properties in the direction of material flow (machine direction, or MD) versus the transverse direction of material flow (transverse machine direction, or TD). It is not uncommon for mechanical properties (e.g., flexural, tensile, impact, CTE) to differ by more than 50% in the MD versus TD of a sheet article. This artifact may be attributed as a result of residual stress in the material and alignment of polymer chains and fillers in the machine direction. Surprisingly, sheet articles made using a thermal compression process can be highly isotropic. In some cases, the mechanical properties for the MD vs. TD in an article produced using a thermal compression process are within 30% of each other. In another embodiment, they are within 20%, and yet in some further embodiments they are within 10%.

The resulting panels generated from the thermal compression of the polymeric composite can be used for various applications. Non-limiting examples include a flooring substrate, a roofing panel, a marine panel, a concrete form, a wall panel, a door panel, an automotive panel, an aerospace panel or a signage panel. Those of ordinary skill in the art will recognize that the unique properties enable many applications. Additionally, the article constructed from the panels may include indicia applied to a surface of the panel.

The panels may be used to create multilayered articles. The panels used to create the multilayer articles may be on the interior or the exterior of the multilayer construction. For example, the panel may serve as one or more layers of a multilayered article. In one embodiment, the multilayered article is constructed of a sheet derived from thermal compression bonding a reclaimed material or a polymeric matrix. An aesthetic layer is then bonded to a surface of the panel to form the multilayered article. In another embodiment, a structural reinforcement layer is bonded to the panel to provide additional structural integrity. In another embodiment a structural layer is included between two panels of the invention to form a so-called sandwich construction. Those of ordinary skill in the art recognize that various distinct or different layers may be attached or bonded to the resulting panels depending upon the intended end use. Additionally, a co-scattering technique may be employed in a thermal compression bonding processes to form such multilayered articles. Those of ordinary skill in the art with knowledge of this disclosure will recognize that certain multilayered articles will be best suited with materials with coefficient of thermal expansion value substantially similar.

A wide variety of polymers conventionally recognized in the art as suitable for melt processing are useful as the polymeric matrix with the lightweight filler to create a panel that is capable of forming the multilayered article. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates and mixtures thereof. Such materials are well suited for thermal compression bonding applications.

The multilayered article may optionally include bonding layers, adhesives, or coupling agents to assist in bonding another material to the panel. The bonding layers, adhesives or coupling agents can be formed as a layer on the panel. Bondable layers include functional polymers and more preferably functional polyolefins. Adhesives includes hot melt adhesives, pressure sensitive adhesives or curable adhesives. Coupling agents include the same compounds disclosed for use in the formation of the polymeric composite. Coupling agents may be incorporated directly in the panel composition.

In one embodiment, the bonding material is applied as an additional layer during thermal compression process. For example, with a continuous double belt press, a second scattering device can be used to apply the second layer onto the primary layer of the polymeric composite.

In an alternative embodiment, the panels may be treated to enable bonding or attachment of additional layers to create the multilayered article. Non-limiting examples of such methods known in the art include plasma treatment, corona treatment, silane treatment, use of primer materials or heat treatment.

Some embodiments of the multilayered article include a support layer bonded to the substrate. A wide variety of materials can be used as the support layer. Cork is one non-limiting example of a support layer. Other non-limiting examples include a polymeric layer, a metalized polymeric layer, a reflective layer, a sound dampening layer, a print receptive layer, a durable layer or combinations thereof. The support layer can be applied onto either side of the panel and may be placed between the panel and the adhesive layer.

A reinforcement layer can also be used in certain embodiments. The reinforcement layer is used to provide additional structural integrity to the substrate for specific applications. The reinforcement layer can be a honeycomb structure, a foam structure, a filled honeycomb structure, a filled polymeric composite, a glass fabric, a polymeric fabric or combinations thereof. The reinforcement layer can be attached to the substrate using thermal lamination, conventional adhesives or bonding agents.

The various embodiments of this disclosure can be used in laminate flooring applications. Laminate flooring typically comprises three or four layers. Laminate flooring can be either glued to sub-flooring or installed as a floating floor. For floating flooring installation, the substrate layer of the tiles or planks are typically interlocked in a tongue and groove or click design to enable durability. Glued floors optionally include tongue and groove or click designs within the substrate. Such designs, while adding some cost, enable faster and less costly installation.

Figure 2:
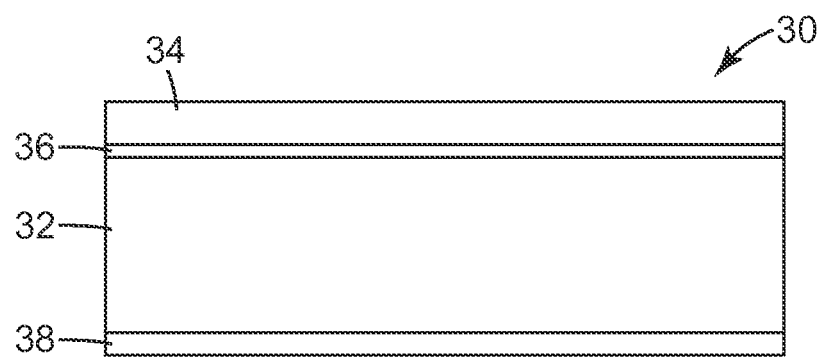
FIG. 2 is a segmented view of a multilayered article of one embodiment.

FIG. 2 is a segmented view of one embodiment particularly suited for use in laminate flooring applications. The construction depicted is intended as a laminated flooring panel 30. The flooring panel 30 includes a substrate 32 produced in accordance with this disclosure. The substrate 32 is bonded to an aesthetic layer 34. The substrate 32 may be bonded to the aesthetic layer 34 using an optional adhesive layer 36. An additional reinforcement layer 38 is bonded to an opposing side of the substrate 32 from the aesthetic layer 34. Various alternative embodiments are known in the industry and include cushioning layers, printable layers, and other layers that provide the necessary decorative and functional properties required for various applications, such as flooring.

In an alternative embodiment, a flooring segment constructed with the substrate made in accordance with this disclosure can have opposing edge surfaces with each edge surface having a profile. One of the edge surfaces can have a connecting profile and the opposite edge surface can have a receiving profile. This type of construction provides the interlocking mechanism or a tongue and groove design. With this embodiment, the connecting profile of first flooring segment fits into the receiving profile of a second flooring segment to enable tongue and groove or click designs.

The aesthetic layer bonded to the panel can comprise a broad range of natural or synthetic materials of varying durability and appearance. Thin laminates of natural materials such as wood, stone or toughened natural fibers composites are common decorative layers. For applications requiring greater durability or lower cost, synthetic materials are commonly used. Recent advances in printing and embossing technologies have resulted in synthetic decorative layers that are ever more realistic in their impression of natural wood and stone.

Interfacial bonding between the panel and any optional layers is a feature that may be addressed differently depending upon the specific materials employed for a selected construction. In some embodiments, an adhesive layer is required for laminate constructions. For example, polyurethane adhesives are broadly used for this layer as they are known to be durable and relatively easy to apply during assembly. Hot melt adhesives are also commonly used. While not particularly demanding in terms of structural strength requirements, the adhesive bond must last the lifetime of the laminate and be robust enough to withstand expansion differences, caused by moisture or temperature changes within the two substrates.

The substrate layer or panel is typically thicker than the aesthetic layer and enables the flooring to be mechanically robust, hide imperfections in the subfloor, resist moisture, and be bondable to the subflooring if needed. The panel provides the necessary stiffness, ability to be grooved for the integration of interlocking mechanisms, and are readily bonded with standard adhesive products.

An optional reinforcement layer is sometimes used in thinner laminate constructions or constructions requiring adhesive to difficult to bond sub-floors. Thinner constructions inherently lack the required mechanical stability and the reinforcement layer provides the needed strength and durability. Fiberglass or woven glass mesh is commonly used backing material for this optional layer. This layer can also be designed to better enable adhesive properties to difficult to bond sub-floorings.

Certain embodiments possess desirable attributes for use in a flooring substrate, a roofing panel, a marine panel, a concrete form, a wall panel, a door panel, an automotive panel, an aerospace panel or a signage panel.

Exemplary embodiments include the following:

Embodiment 1

A composition comprising a composite of a reclaimed polymeric compound, a high aspect ratio filler and a lightweight filler.

Embodiment 2

A composition according to embodiment 1, further comprising one or more of an inorganic filler, an organic filler, a coupling agent, a desiccant, a lubricant, an antimicrobial or combinations thereof.

Embodiment 3

A composition of embodiment 2, wherein the desiccant is calcium oxide, magnesium oxide, strontium oxide, barium oxide, aluminum oxide, or combinations thereof.

Embodiment 4

A composition according to any of embodiments 1 to 3, wherein the reclaimed polymeric material includes the high aspect ratio filler.

Embodiment 5

A composition according to any of embodiments 2 to 4, wherein the inorganic material is volcanic ash, calcium carbonate, talc, mica, fly ash, andesiteic rock, feldspars, aluminosilicate clays, obsidian, diatomaceous earth, silica, silica fume, bauxite, geopolymers pumice, perlite, pumicsite or combinations thereof.

Embodiment 6

A composition according to any of embodiments 1 to 5, wherein the reclaimed polymeric material includes reclaimed polymers from hydropulping processes, low density polyethylene, polymers from agricultural film waste streams, polymers from municipal waste streams, polymers from medical waste streams, or combinations thereof.

Embodiment 7

A composition according to any of embodiments 1 to 6, wherein the reclaimed polymeric material includes cellulose.

Embodiment 8

A composition according to any of embodiments 1 to 7, wherein the composite is derived from dry processing or melt processing.

Embodiment 9

A composition according to any of embodiments 1 to 8, wherein the high aspect ratio filler has an aspect ratio of greater than 2:1.

Embodiment 10

An article comprising a substrate derived from thermal compression bonding a composite of a reclaimed polymeric compound, a high aspect ratio filler, and a lightweight filler.

Embodiment 11

An article according to embodiment 10, wherein the high aspect ratio filler has an aspect ratio of greater than 2:1.

Embodiment 12

An article according to any of embodiments 10 or 11, wherein the lightweight filler is expanded volcanic ash, perlite, pumice, cenospheres, glass microspheres, ceramic microspheres, polymeric microspheres, foamed polymeric beads, cellulosic fiber, or combination thereof.

Embodiment 13

An article according to any of embodiments 10 to 12, wherein the substrate is further derived from one or more of an inorganic filler, organic filler, a coupling agent, a desiccant, a lubricant, an antimicrobial or combinations thereof.

Embodiment 14

An article according to any of embodiment 13, wherein the inorganic filler is volcanic ash, mica, calcium carbonate, talc, fly ash, andesiteic rock, feldspars, aluminosilicate clays, obsidian, diatomaceous earth, silica, silica fume, bauxite, geopolymers pumice, perlite, pumicsite or combinations thereof.

Embodiment 15

An article according to any of embodiments 10 to 14, wherein the substrate exhibits at least two of flexural modulus of greater than 700 MPa, a notched impact strength of at least 300 J/m, a tensile elongation of at least 4%, and a coefficient of thermal expansion of less than 70 μm/m/K.

Embodiment 16

An article according to any of embodiments 10 to 15, wherein the substrate exhibits a specific gravity of about 0.5 to 1.6 g/cm$^3$, about 0.7 to 1.2 g/cm$^3$, or about 0.5 to 1.0 g/cm$^3$.

Embodiment 17

An article according to any of embodiments 10 to 16, wherein the substrate exhibits water absorption of less than 10% as indicated after submersion in water for twenty-four hours at room temperature.

Embodiment 18

An article according to any of embodiments 10 to 17, wherein the article is a flooring substrate, a roofing panel, a marine panel, a concrete form, wall panel, door panel, automotive panel, aerospace panel or a signage panel.

Embodiment 19

An article according to any of embodiments 10 to 18, wherein the article includes indicia applied to a surface of the substrate.

Embodiment 20

An article according to any of embodiments 10 to 19, further comprising a polymer bonded to a surface of the substrate.

Embodiment 21

An article according to embodiment 20, wherein the polymer is co-scattered with the composite during thermal compression bonding.

Embodiment 22

An article according to embodiment 20, wherein the polymer possesses a coefficient of thermal expansion substantially similar to that of the substrate.

Embodiment 23

An article according to any of embodiments 10 to 22, wherein a flexural modulus of the substrate in a machine direction is at least 30%, at least 20%, or at least 10% of a flexural modulus of the substrate in a transverse machine direction.

Embodiment 24

An article according to any of embodiments 10 to 23, wherein a coefficient of thermal expansion of the substrate in a machine direction is at least 30%, at least 20%, or at least 10% of a coefficient of thermal expansion of the substrate in a transverse machine direction.

Embodiment 25

An article according to any of embodiments 10 to 24, wherein an impact strength of the substrate in the machine direction is at least 30%, at least 20%, or at least 10% of an impact strength of the substrate in a transverse machine direction.

Embodiment 26

An article according to any of embodiments 10 to 25, wherein the substrate a thermal expansion of less than 0.5%, or less than 0.35%, according to the Thermal Expansion Test Method.

Embodiment 27

An article comprising a substrate derived from thermal compression bonding a composite of a polymer and a lightweight filler, and optionally an organic filler or inorganic filler or combinations thereof wherein the substrate has a specific gravity of about less than 1.6 g/cm$^3$, and a coefficient of thermal expansion of less than 70 µm/m/K.

Embodiment 28

An article according to embodiment 27, wherein the substrate as a thermal expansion of less than 0.5% according to the Thermal Expansion Test Method.

Embodiment 29

An article comprising a composite of a polymeric matrix, a high aspect ratio filler, and a lightweight filler, and optionally an organic filler or inorganic filler or combinations thereof wherein the composite exhibits a specific gravity of about 0.5 to 1.6 g/cm$^3$, a coefficient of thermal expansion of less than 70 µm/m/K, and a water absorption of less than 10% as indicated after submersion in water for twenty-four hours at room temperature.

Embodiment 30

An article comprising a substrate derived from thermal compression bonding reclaimed polymeric compound.

Embodiment 31

An article according to embodiment 30, wherein the reclaimed polymeric material includes reclaimed polymers from hydropulping processes, low density polyethylene, polymers from agricultural film waste streams, polymers from municipal waste streams, polymers from medical waste streams, or combinations thereof.

Embodiment 32

An article comprising a substrate derived from thermal compression bonding a composite of (i) a reclaimed polymeric material or polymeric compound, and (ii) a high aspect ratio filler (iii) a lightweight filler, and optionally (iv) an organic or inorganic filler, wherein the substrate exhibits at least two of a specific gravity of about 0.5 to 1.6 g/cm$^3$, a coefficient of thermal expansion of less than 70 µm/m/K, a thermal expansion of less than 0.5% according to the Thermal Expansion Test Method, and a water absorption of less than 10% as indicated after submersion in water for twenty-four hours at room temperature.

Embodiment 33

A method comprising thermal compression bonding a composite to form a substrate, wherein the composite is a reclaimed polymeric compound.

Embodiment 34

A method according to embodiment 33, further comprising one or more of a high aspect ratio filler a lightweight filler, or combination thereof.

Embodiment 35

A method according to any of embodiments 33 or 34, further comprising one or more of an inorganic filler, an organic filler, a coupling agent, a desiccant, a lubricant, an antimicrobial or combinations thereof.

Embodiment 36

A method according to any of embodiments 33 to 35, wherein the composite is co-scattered with another polymeric compound, and upon thermal compression bonding forms a multilayered substrate.

Embodiment 37

A method according to any of embodiments 33 to 35, further comprising applying an adhesive composition that is formed as a layer on the substrate.

Embodiment 38

A method according to embodiment 37, further comprising surface treating the substrate prior to bonding the adhesive composition.

Embodiment 39

A method according to any of embodiments 33 to 39, further comprising bonding an aesthetic layer to a surface of the substrate.

Embodiment 40

A method according to embodiment 39, further comprising treating the surface of the substrate prior to bonding an aesthetic layer to the substrate.

Embodiment 41

A method according to embodiment 39, wherein an adhesive bonds the aesthetic layer to the substrate.

Embodiment 42

A method according to any of embodiments 33 to 41, wherein the substrate is a flooring substrate, a roofing panel, a marine panel, a concrete form, wall panel, door panel, automotive panel, aerospace panel or a signage panel.

Embodiment 43

A method comprising;
(a) scattering a composite onto a first rotating belt, wherein the composite is derived from one or more of (i) a reclaimed polymeric compound, or (ii) a reclaimed polymeric material and a lightweight filler, and optionally an organic filler or inorganic filler or combinations thereof, and
(b) thermal compression bonding the composite between the first rotating belt with a second rotating belt to form a substrate.

Embodiment 44

A method according to embodiment 43, further comprising scattering a layer of a second compound onto the composite to form a multilayered article.

Embodiment 45

A method according to embodiment 44, wherein the second compound includes a coupling agent, an adhesive or a combination thereof.

Embodiment 46

A method according to any of embodiments 43 to 45, further comprising bonding a sheet of material to a surface of the substrate.

Embodiment 47

A method according to any of embodiments 43 to 46, further comprising treating a surface of the substrate.

Embodiment 48

A method according to any of embodiments 43 to 47, wherein treating includes plasma treatment, silane treatment, heat treatment, corona treatment, or combinations thereof.

Embodiment 49

A multilayered article comprising,
(a) substrate derived from thermal compression bonding a composite of (i) a reclaimed polymeric material or polymer, and (ii) a lightweight filler and optionally an organic filler or inorganic filler or combinations thereof, and
(b) a second layer bonded to a surface of the substrate.

Embodiment 50

A multilayered article according to embodiment 49, wherein the second layer is an aesthetic layer, a reinforcing layer, a sound dampening layer, an adhesive layer, a bondable layer, a support layer, a printable layer, polymeric layer, reflective layer, or combinations thereof.

Embodiment 51

A multilayered article according to embodiment 49 or 50, wherein the second layer is an aesthetic layer.

Embodiment 52

A multilayered article according to embodiment 51, further comprising a reinforcement layer bonded to a surface of the substrate opposite the aesthetic layer.

Embodiment 53

A multilayered article according to embodiment 51, further comprising a sound dampening layer bonded to a surface of the substrate opposite the aesthetic layer.

Embodiment 54

A multilayered article according to embodiment 51, wherein the aesthetic layer is bonded to the substrate with an adhesive.

Embodiment 55

A multilayered article according to embodiment 54, wherein the adhesive includes hot melt adhesives, pressure sensitive adhesives or curable adhesives.

Embodiment 56

A multilayered article according to any of embodiments 51 to 55, further comprising a bondable layer positioned between the substrate and the aesthetic layer.

Embodiment 57

A multilayered article according embodiment 56, wherein the bondable layer includes functional polymers and functional polyolefins.

Embodiment 58

A multilayered article according to any of embodiments 51 to 57, further comprising a support layer bonded between the substrate and the aesthetic layer.

Embodiment 59

A multilayered article according to embodiment 58, wherein the support layer is cork, cork composites, polymeric layer, metalized polymeric layer, reflective layer, print receptive layer or combinations thereof.

Embodiment 60

A multilayered article according to embodiment 52, wherein the reinforcement layer is a honeycomb structure, a foam structure, a filled honeycomb structure, a filled polymeric composite, or combinations thereof.

Embodiment 61

A multilayered article according to any of embodiments 49 to 60, wherein the substrate exhibits at least two of flexural modulus of greater than 700 MPa, a notched impact strength of at least 300 µm, a tensile elongation of at least 4%, substrate a thermal expansion of less than 0.5% according to the Thermal Expansion Test Method, and a coefficient of thermal expansion of less than 70 µm/m/K.

Embodiment 62

A multilayered article according to any of embodiments 49 to 61, wherein a flexural modulus of the substrate in a machine direction is at least 30%, at least 20%, or at least 10% of a flexural modulus of the substrate in a transverse machine direction.

Embodiment 63

A multilayered article according to any of embodiments 49 to 62, wherein a coefficient of thermal expansion of the substrate in a machine direction is at least 30%, at least 20%, or at least 10% of a coefficient of thermal expansion of the substrate in a transverse machine direction.

Embodiment 64

A multilayered article according to any of embodiments 49 to 63, wherein an impact strength of the substrate in the machine direction is at least 30%, at least 20%, or at least 10% of an impact strength of the substrate in a transverse machine direction.

Embodiment 65

An article comprising a flooring segment created from the multilayered article of any of embodiments 49 to 64.

Embodiment 66

An article according to embodiment 65, wherein the flooring segment has opposing edge surfaces with each edge surface having a profile, wherein one edge surface has a connecting profile and the opposite edge surface has a receiving profile.

Embodiment 67

An article according to embodiment 65, further comprising multiple flooring segments, each having opposing edge surfaces with each edge surface having a profile, wherein one edge surface has a connecting profile and the opposite edge surface has a receiving profile, and wherein the connecting profile of a first flooring segment fits into the receiving profile of a second flooring segment.

Embodiment 68

A composition, article, method, or multilayered article of any of the previous embodiments wherein the composite or reclaimed polymeric material includes additives selected from antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, adhesion promoting agents, pigments or combinations thereof.

Embodiment 69

A composition comprising a reclaimed polymeric material, expanded volcanic ash, cellulosic material, and an inorganic filler.

EXAMPLES

TABLE 1

MATERIALS

| MATERIAL | DESCRIPTION |
|---|---|
| Reclaimed Polymer | Recycled LDPE, commercially available from AERT, Inc (Springdale, AR) |
| PP | Profax 6301, polypropylene, commercially available from LyondellBasell Corp. (Houston, TX) |
| Filler 1 | Dry volcanic ore, commercially available from Kansas Minerals, Inc. (Mankato, KS) |

TABLE 1-continued

MATERIALS

| MATERIAL | DESCRIPTION |
|---|---|
| Filler 2 | Calcium Carbonate, GLC1012C, commercially available from Great Lakes Calcium (Green Bay, WI) |
| Filler 3 | 120 mesh maple wood fiber, commercially available from American Wood Fibers (Schofield, WI) |
| Filler 4 | EC14/738 4 mm Thermoflow 738 glass fibers, commercially available from Johns Manville Corp. (Waterville, OH) |
| Lightweight Filler | Kamco 5, Expanded Volcanic Ash, commercially available from Kansas Minerals, Inc. (Mankato, KS) |
| Desiccant | Polycal OFT15 calcium oxide, commercially available from Mississippi Lime (St Louis, MO) |
| Lubricant | Drakeol 600, commercially available Calumet Specialty Products (Indianapolis, IN) |

Preparation of Examples 1-2

Composite sheet sample examples 1 and 2 were prepared and tested using the following protocol. Flake PP, filler and additives were dry blended in a large polyethylene bag. The resulting materials were continuously compression molded into a sheet having a thickness of approximately 3.0 mm and a width of 1200 mm using a double belt press commercially available from TechnoPartner Samtronic (Goppingen, Germany). The samples were processed at 200° C. for all heating zones and 70° C. for the cooling zones. The line speed was 1.0 m/min. The resulting sheet samples were machined into 300 mm×300 mm test specimens. Thermal Expansion Test Method was used to determine the percent expansion. 15 cm×15 cm samples of the panel were measured in both the X and Y dimension at room temperature (25° C.) using a micrometer. The samples were subsequently placed in a laboratory oven that was set to 70° C. After 1 hour, the samples were removed from the oven and immediately measured using a micrometer in the X and Y dimensions. The percent expansion was subsequently determined from these two measurements. The moisture uptake was also determined for each formulation. To do so, the mass of approximately 15 cm×15 cm samples were first measured. The samples were subsequently placed in a water batch at room temperature. After 24 hours, the samples were removed from the bath, blotted dry with a paper towel to remove surface moisture and weighed. The % moisture uptake was subsequently determined from these measurements. Specific Gravity was determined for all samples using Archimedes Method. The resulting properties of examples 1 and 2 are reported in Table 2.

Preparation of Examples 3-11

Examples 3-11 were prepared in an identical fashion to Examples 1-2 with the exception that after samples 3-11 were dry blended, they were subsequently formed into test specimens by compression molding in a Dake compression molding press (Commercially available from Dake, Inc., Grand Haven, Mich.). Samples were pressed in this apparatus for 5 minutes at 200° C. and 5 tons of pressure. The resulting samples were trimmed using a band saw to samples approximately 7.5 cm×7.5 cm and tested for thermal expansion and moisture uptake as specified previously.

TABLE 2

Experimental Formulations for Examples 1-2

| Sample | PP | Filler 1 | Lightweight Filler | Lubricant |
|---|---|---|---|---|
| 1 | 58 | 30 | 5 | 2 |
| 2 | 58 | 25 | 10 | 2 |

TABLE 3

Experimental Formulations for Examples 3-11

| Sample | Reclaimed Polymer | Filler 1 | Filler 2 | Filler 3 | Filler 4 | Lightweight Filler | Desiccant |
|---|---|---|---|---|---|---|---|
| 3 | 96.5 | — | | | | 2.5 | 1 |
| 4 | 94 | | | | | 5.0 | 1 |
| 5 | 79 | | | | | 20 | 1 |
| 6 | 69 | | | | | 30 | 1 |
| 7 | 69 | 25 | | | | 5 | 1 |
| 8 | 59 | 25 | | 10 | | 5 | 1 |
| 9 | 69 | 20 | | 5 | | 5 | 1 |
| 10 | 59 | | 35 | | | 5 | 1 |
| 11 | 59 | 35 | | | | 5 | 1 |

TABLE 4

Physical Properties of Examples 1-11

| Sample | Thermal Expansion (%) | Moisture Uptake (%) | Specific Gravity (g/cm³) |
|---|---|---|---|
| 1 | 0.23 | 0.01 | 1.04 |
| 2 | 0.18 | 0.02 | 0.98 |
| 3 | 0.49 | 0.10 | 0.94 |
| 4 | 0.41 | 0.16 | 0.86 |
| 5 | 0.20 | 13.2 | 0.65 |
| 6 | 0.06 | 42.4 | 0.49 |
| 7 | 0.26 | 9.7 | 1.04 |
| 8 | 0.12 | 9.06 | 1.10 |
| 9 | 0.28 | 1.47 | 1.02 |
| 10 | 0.30 | 11.3 | 1.10 |
| 11 | 0.27 | 20.2 | 1.10 |

What is claimed is:

1. A multilayered article comprising,
(a) a substrate formed by thermal compression bonding, the substrate having a machine direction and a transverse machine direction and including (i) a polymeric material from a hydropulping process, or (ii) a composite of a reclaimed polymeric material or polymer, and a lightweight filler and optionally an organic filler or inorganic filler or combinations thereof; and
(b) a second layer bonded to a surface of the substrate;
(c) wherein the substrate has one or more measurable mechanical properties in the machine direction and one or more corresponding measurable mechanical properties in the transverse machine direction, wherein the one or more measurable mechanical properties in the machine direction and the one or more corresponding measurable mechanical properties in the transverse machine direction are selected from a group consisting of flexural modulus, impact strength, tensile elongation, and coefficient of thermal expansion; and
(d) wherein the substrate is highly isotropic, such that the one or more measurable mechanical properties in the machine direction and the one or more corresponding measurable mechanical properties in the transverse machine direction are within about 30% of each other.

2. A multilayered article according to claim 1, wherein the second layer comprises an aesthetic layer, a reinforcing layer, a sound dampening layer, an adhesive layer, a bondable layer, a support layer, a printable layer, polymeric layer, reflective layer, or combinations thereof.

3. A multilayered article according to claim 2, further comprising an aesthetic layer, a reinforcing layer, a sound dampening layer, an adhesive layer, a bondable layer, a support layer, a printable layer, polymeric layer, or reflective layer bonded to a surface of the substrate opposite the second layer.

4. A multilayered article according to claim 1, wherein the second layer is bonded to the substrate with a hot melt adhesive, pressure sensitive adhesive or curable adhesive.

5. A multilayered article according to claim 2, further comprising a bondable layer positioned between the substrate and the aesthetic layer.

6. A multilayered article according claim 5, wherein the bondable layer includes functional polymers and functional polyolefins.

7. A multilayered article according to claim 2, further comprising a support layer bonded between the substrate and the aesthetic layer, wherein the support layer is cork, cork composites, polymeric layer, metalized polymeric layer, reflective layer, print receptive layer or combinations thereof.

8. A multilayered article according to claim 1, wherein the second layer comprises a reinforcement layer having a honeycomb structure, a foam structure, a filled honeycomb structure, a filled polymeric composite structure, or combinations thereof.

9. A multilayered article according to claim 1, wherein the substrate exhibits at least two of flexural modulus of greater than 700 MPa, a notched impact strength of at least 300 J/m, a tensile elongation of at least 4%, a thermal expansion of less than 0.5% according to the Thermal Expansion Test Method, and a coefficient of thermal expansion of less than 70 μm/m/K.

10. A multilayered article according to claim 1, wherein at least flexural modulus is selected as one of the one or more measurable mechanical properties in the machine direction and the one or more corresponding measurable mechanical properties in the transverse machine direction.

11. A multilayered article according to claim 1, wherein at least coefficient of thermal expansion is selected as one of the one or more measurable mechanical properties in the machine direction and the one or more corresponding measurable mechanical properties in the transverse machine direction.

12. A multilayered article according to claim 1, wherein at least impact strength is selected as one of the one or more measurable mechanical properties in the machine direction and the one or more corresponding measurable mechanical properties in the transverse machine direction.

13. An article comprising a flooring segment created from the multilayered article of claim 1.

14. An article according to claim 13, wherein the flooring segment has opposing edge surfaces with each edge surface having a profile, wherein one edge surface has a connecting profile and the opposite edge surface has a receiving profile.

15. An article according to claim 13, further comprising multiple flooring segments, each having opposing edge surfaces with each edge surface having a profile, wherein one edge surface has a connecting profile and the opposite edge surface has a receiving profile, and wherein the connecting profile of a first flooring segment fits into the receiving profile of a second flooring segment.

16. A method comprising, thermal compression bonding (i) a polymeric material from a hydropulping process, or (ii) a composite of a reclaimed polymeric material or polymer, and a lightweight filler and optionally an organic filler or inorganic filler or combinations thereof, to form a substrate, and bonding a second layer a surface of the substrate to form a multilayered article.

17. A method according to claim 16, wherein the second layer comprises an aesthetic layer, a reinforcing layer, a sound dampening layer, an adhesive layer, a bondable layer, a support layer, a printable layer, polymeric layer, reflective layer, or combinations thereof.

18. The multilayered article of claim 1, wherein the one or more measurable mechanical properties in the machine direction and the one or more corresponding measurable mechanical properties in the transverse machine direction are within about 20% of each other.

19. The multilayered article of claim 1, wherein the one or more measurable mechanical properties in the machine direction and the one or more measurable mechanical properties in the transverse machine direction are within about 10% of each other.

* * * * *